(12) United States Patent
Ford

(10) Patent No.: US 10,190,399 B2
(45) Date of Patent: Jan. 29, 2019

(54) TRAVELING VALVE ASSEMBLY AND METHOD THEREFOR

(71) Applicant: Michael Brent Ford, St. George, UT (US)

(72) Inventor: Michael Brent Ford, St. George, UT (US)

( * ) Notice: Subject to any disclaimer, the term of this patent is extended or adjusted under 35 U.S.C. 154(b) by 532 days.

(21) Appl. No.: 14/686,337

(22) Filed: Apr. 14, 2015

(65) Prior Publication Data

US 2016/0305409 A1  Oct. 20, 2016

(51) Int. Cl.
| | | |
|---|---|---|
| *E21B 43/12* | (2006.01) | |
| *F04B 47/00* | (2006.01) | |
| *F04B 53/10* | (2006.01) | |
| *F04B 53/16* | (2006.01) | |
| *F16K 15/18* | (2006.01) | |
| *F04B 53/12* | (2006.01) | |
| *E21B 34/08* | (2006.01) | |

(52) U.S. Cl.
CPC ............ *E21B 43/126* (2013.01); *E21B 34/08* (2013.01); *F04B 53/10* (2013.01); *F04B 53/12* (2013.01); *F04B 53/16* (2013.01); *F16K 15/183* (2013.01); *F04B 47/00* (2013.01)

(58) Field of Classification Search
CPC .... F04B 47/00; F04B 53/1002; F04B 53/126; F04B 53/10; F04B 53/125; F04B 47/02; F04B 53/16; E21B 43/126
USPC ..... 417/430, 53, 55.2, 547, 552, 554, 555.1; 137/533.11, 533, 19, 533.13, 533.25, 137/533.15
See application file for complete search history.

(56) References Cited

U.S. PATENT DOCUMENTS

| | | | | |
|---|---|---|---|---|
| 1,614,000 A | * | 1/1927 | Hendricks ............ | F04B 53/122 417/511 |
| 3,139,039 A | * | 6/1964 | Adams .................... | F04B 47/00 417/511 |
| 4,867,242 A | * | 9/1989 | Hart ........................ | E21B 34/06 166/105 |
| 5,178,184 A | * | 1/1993 | Skillman ................. | F16K 15/04 137/533.13 |
| 5,472,326 A | * | 12/1995 | Tarpley ................. | F04B 53/005 137/533.15 |
| 5,829,952 A | * | 11/1998 | Shadden ................. | E21B 34/06 137/533.25 |
| 6,481,987 B2 | * | 11/2002 | Ford ....................... | F04B 47/02 417/430 |
| 7,069,997 B2 | * | 7/2006 | Coyes ................. | F04B 53/1007 137/533.11 |
| 7,713,035 B2 | | 5/2010 | Ford | |
| 7,878,767 B2 | | 2/2011 | Ford | |
| 8,453,673 B2 | | 6/2013 | Ford | |

* cited by examiner

*Primary Examiner* — Nathan C Zollinger
(74) *Attorney, Agent, or Firm* — Weiss & Moy, P.C.; Veronica-Adele R. Cao; Jeffrey D. Moy

(57) ABSTRACT

A traveling valve assembly adapted to be coupled to a southern end of a pump plunger wherein the traveling valve has an elongated body and two ball valves, one positioned at the northern end of the traveling valve and another positioned at the southern end of the traveling valve. The traveling valve prevents pumped fluid that has slipped downwardly past the pump plunger from continuing to slip further down into the pump barrel. The traveling valve captures that pumped fluid that has slipped downwardly so that it may be produced upwardly through the pump.

8 Claims, 7 Drawing Sheets

TRAVELING VALVE ASSEMBLY AND METHOD THEREFOR

FIELD OF THE INVENTION

The present invention generally relates to oil pumps and traveling valves used therein, and more specifically, to an improved traveling valve and related method therefor.

BACKGROUND OF THE INVENTION

In general terms, an oil well pumping system begins with an above-ground pumping unit, which creates the up and down pumping action that moves the oil (or other substance being pumped) out of the ground and into a flow line, from which the oil is taken to a storage tank or other such structure.

Below ground, a shaft is lined with piping know as "tubing." A sucker rod, which is ultimately, indirectly coupled at its north end to the pumping unit is inserted into the tubing. The sucker rod is coupled at its south end indirectly to the oil pump itself, which is also located within the tubing, which is sealed at its base to the tubing. The sucker rod couples to the oil pump at a coupling known as a 3-wing cage.

Beginning at the south end, oil pumps generally include a standing valve, which has a ball therein, the purpose of which is to regulate the passage of oil (or other substance being pumped) from downhole into the pump, allowing the pumped matter to be moved northward out of the system and into the flow line, while preventing the pumped matter from dropping back southward into the hole. Oil is permitted to pass through the standing valve and into the pump by the movement of the ball off of its seat, and oil is prevented from dropping back into the hole by the seating of the ball.

North of the standing valve, coupled to the sucker rod, is a traveling valve. The purpose of the conventional traveling valve is to regulate the passage of oil from within the pump northward in the direction of the flow line, while preventing the pumped oil from slipping back down in the direction of the standing valve and hole.

In use, oil is pumped from a hole through a series of "downstrokes" and "upstrokes" of the oil pump, wherein these motions are imparted by the above-ground pumping unit. During the upstroke, formation pressure causes the ball in the standing valve to move upward, allowing the oil to pass through the standing valve and into the barrel of the oil pump. This oil will be held in place between the standing valve and the traveling valve. In the conventional traveling valve, the ball is located in the seated position. It is held there by the pressure from the oil that has been previously pumped. The oil located above the traveling valve is moved northward in the direction of the 3-wing cage at the end of the oil pump.

During the downstroke, the ball in the conventional traveling valve unseats, permitting the oil that has passed through the standing valve to pass therethrough. Also during the downstroke, the ball in the standing valve seats, preventing the pumped oil from slipping back down into the hole.

The process repeats itself again and again, with oil essentially being moved in stages from the hole, to above the standing valve and in the oil pump, to above the travelling valve and out of the oil pump. As the oil pump fills, the oil passes through the 3-wing cage and into the tubing. As the tubing is filled, the oil passes into the flow line, from which the oil is taken to a storage tank or other such structure.

There are a number of problems that are regularly encountered during oil pumping operations. Oil that is pumped from the ground is generally impure, and includes water, gas, and impurities such as sand. During pump operations, the presence of gas in the oil can create a condition that is sometimes referred to as "gas lock." Gas lock occurs when a quantity of gas becomes trapped between the traveling valve and standing valve balls. In this situation, hydrostatic pressure from above the traveling valve ball holds it in a seated position, while the pressure from the trapped gas will hold the standing valve ball in a seated position. With the balls unable to unseat, pumping comes to a halt.

The typical response to a gas lock is to remove the oil pump and release the trapped gas. This can be time-consuming and, of course, interrupts pumping operations.

Another problem is related to the ball and seat for the ball within the traveling valve. During pumping operations, the ball is continuously being lifted off the seat, rotating, and re-seating. However, because the traveling valve ball is not coupled to the seat, it does not always perfectly center when seating. This can result in some leakage in the traveling valve and thus pumping inefficiency. Moreover, improper seating can cause damage to both the ball and the seat, which are the shortest wear items in the oil pump. When these are sufficiently worn, pumping operations must be interrupted and the entire oil pump removed for their replacement. Relatedly, while the seat can be inverted to extend its life, the constant rotation of the ball results in substantially even wear over the entire surface of the ball, making inversion to extend ball life impossible.

Still another problem is related to the impurities commonly found in the oil, such as sand. Sand can become trapped between the side of the traveling valve and the interior wall of the oil pump. When it becomes trapped in this manner, the constant up and down motion of the traveling valve can lead to scoring of the traveling valve, ultimately reducing its effectiveness and sometimes requiring its replacement. Sand can also get between the ball and seat, preventing proper seating, possibly leading to damage and inefficiency.

Yet another problem is encountered during deviated or non-vertical pumping operations. It is often necessary to conduct pumping operations in an angled or even horizontal direction, where for one reason or another, e.g., where a building is located directly over the hole, it is impossible to access the hole from directly above. In these instances, a well is sunk vertically at a distance from the site, and the well (including the oil pump) is then extended at an angle or perhaps even horizontally to the hole. Where the oil pump is operating in a non-vertical orientation, the traveling valve ball will be pulled by gravitational forces toward the side of the traveling valve, preventing it from fully seating, potentially causing damage and inefficiency.

The pumping of heavy crude also presents problems. The viscosity of this fluid can prevent the traveling valve ball from seating as quickly as it should for optimal performance. This reduces pumping efficiency.

A solution to the above-mentioned problems was disclosed in U.S. Pat. No. 6,481,987, which was issued to the inventor herein on Nov. 19, 2002. However, when using the traveling valve disclosed in U.S. Pat. No. 6,481,987, oil that is present within the mini drag plunger at the completion of a downstroke may be left behind in the pump barrel during the occurrence of the next upstroke. The amount of oil that is left behind in the pump barrel is the same amount of new oil, therefore, that cannot be drawn into the pump barrel through the standing valve during the next upstroke. Cumulatively, this may lead to a large amount of oil that is not being produced from the pump barrel during each downstroke/upstroke pump cycle. For example, at a rate of 10 strokes per minute, in one month, the amount of oil left behind in the pump barrel could amount to over 200 barrels of fluid not being pumped.

The present invention addresses these problems encountered in the prior art pumping systems by eliminating gas lock, minimizing pump damage caused by solids in the fluid, and recovering fluid slippage as well as other related advantages.

SUMMARY

In accordance with one embodiment of the present invention, a traveling valve assembly for use in a pumping apparatus is disclosed. The traveling valve assembly comprises: an elongated body adapted to be coupled to a southern end of a pump plunger, the elongated body having a northern end and a southern end; a first ball valve positioned at the northern end of the elongated body; and a second ball valve positioned at the southern end of the elongated body.

In accordance with another embodiment of the present invention, a traveling valve assembly for use in a pumping apparatus is disclosed. The traveling valve assembly comprises: an elongated body adapted to be coupled to a southern end of a pump plunger, the elongated body having a northern end and a southern end; a first ball valve positioned at the northern end of the elongated body, the first ball valve comprising: a free-floating ball; and a seat; a second ball valve positioned at the southern end of elongated body, the second ball valve comprising: an anchor assembly; an anchored ball; and a seat; wherein the first ball valve and the second ball valve are both in an open position during a downstroke, the second ball valve opening before the first ball valve opens; and wherein the first ball valve and the second ball valve are both in a closed position during an upstroke, the first ball valve closing before the second ball valve closes.

In accordance with another embodiment of the present invention, a method for efficiently pumping fluid from a pump barrel is disclosed. The method comprises the steps of: providing a traveling valve assembly for use in a pumping apparatus and adapted to be coupled to a southern end of a pump plunger, the traveling valve assembly comprising: a cage; a helical insert positioned within the cage; a helical ported stem coupled to a southern end of the cage; a seat plug slidably coupled about a portion of the helical ported stem; a friction chamber coupled to the seat plug; a first ball valve positioned within the cage proximate a northern end of the traveling valve assembly; and a second ball valve positioned within the friction chamber proximate a southern end of the traveling valve assembly; opening both the first ball valve and the second ball valve during a downstroke allowing pumped fluid to enter the traveling valve assembly between the first ball valve and the second ball valve; closing both the first ball valve and the second ball valve during an upstroke allowing the fluid that has entered the traveling valve assembly to travel northward and exit the traveling valve assembly through the cage and preventing the fluid from flowing southward and exiting the traveling valve assembly through the friction chamber; and accumulating fluid that has slipped below the pump plunger within the friction chamber to be produced upwardly through the traveling valve assembly on an upcoming pump cycle.

BRIEF DESCRIPTION OF THE DRAWINGS

The present application is further detailed with respect to the following drawings. These figures are not intended to limit the scope of the present application, but rather, illustrate certain attributes thereof.

DETAILED DESCRIPTION OF THE INVENTION

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

FIGS. 1-9 together disclose a traveling valve assembly 10 which is adapted to be used within a pump barrel. The traveling valve assembly 10 of the present invention may have an elongated body 11 with two ball valves, one at its northern end 12 and one at its southern end 14. As described in further detail below, the elongated body 11 may comprise a cage 22, a helical insert 26, a helical ported stem 44, a seat plug 58, and a friction chamber 54. The ball valve at the northern end 12 may use a free-floating ball 40 with a stationary seat 42 and the ball valve at the southern end 14 may use a stationary or anchored ball 66 with a floating or moving seat 60.

Figure 1:
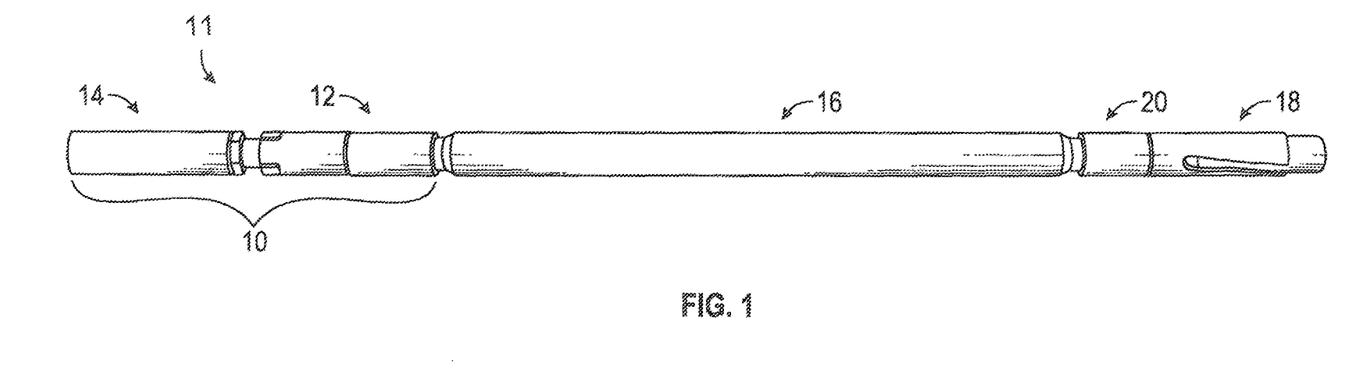
FIG. 1 is a side view of a traveling valve assembly in accordance with one or more aspects of the present invention, wherein a northern end of the traveling valve assembly is shown coupled to a southern end of a pump plunger.
Figure 2:
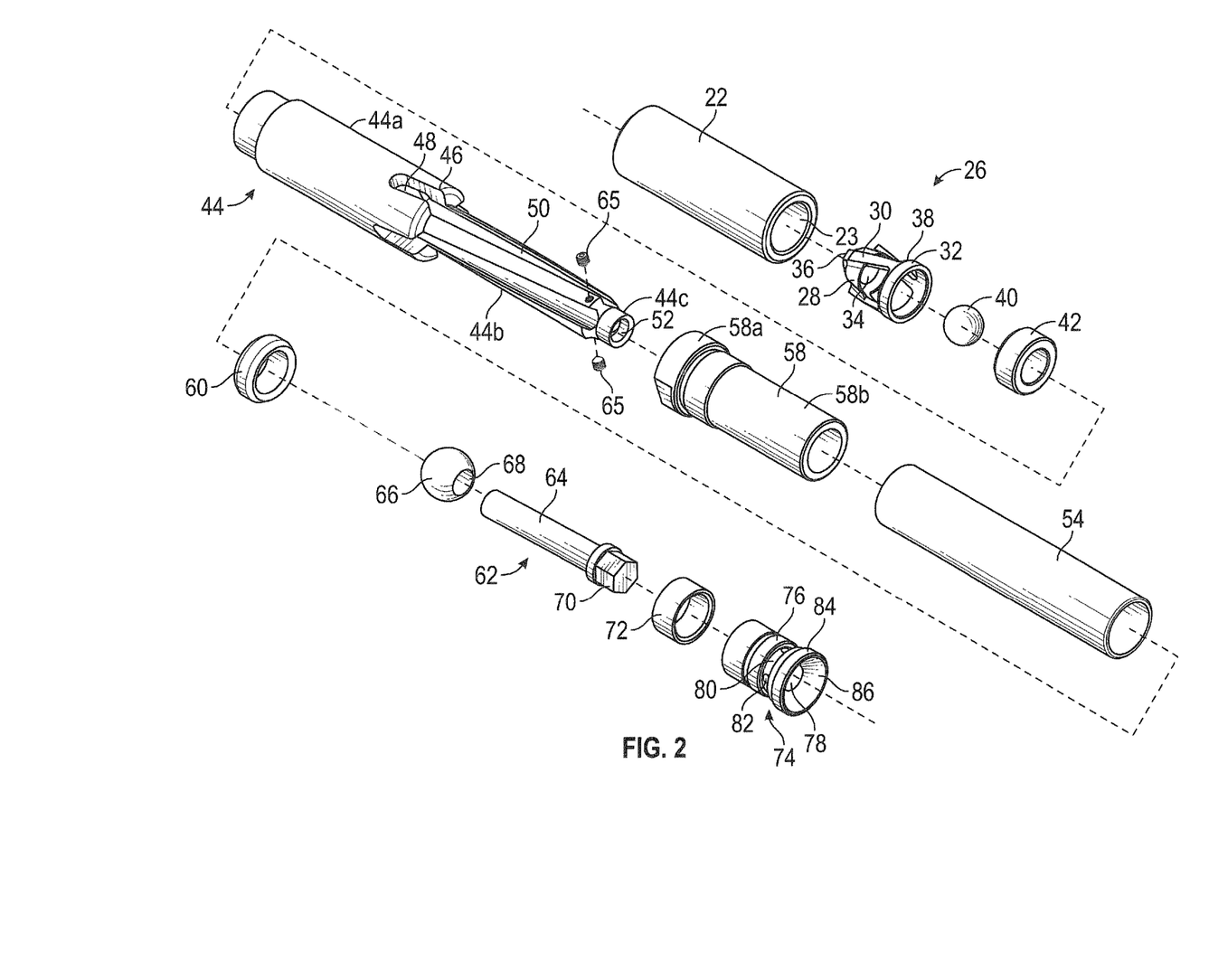
FIG. 2 is a perspective, exploded view of a traveling valve assembly in accordance with one or more aspects of the present invention.
Figures 3, 3A:
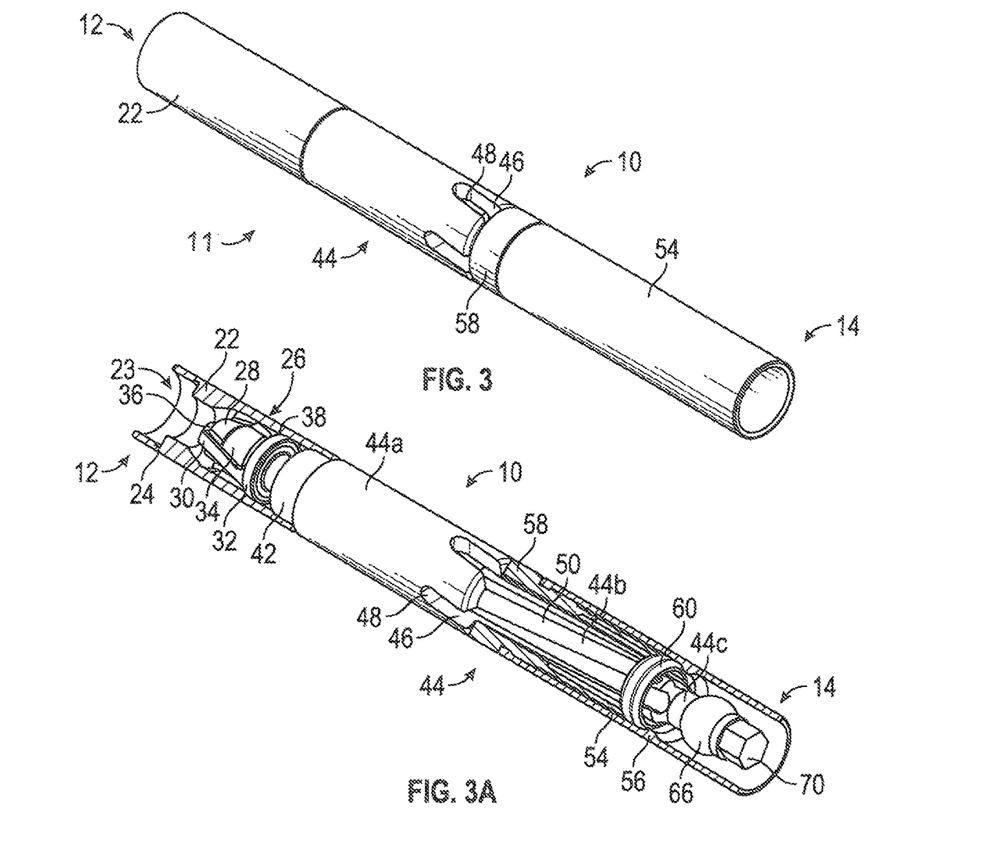
FIG. 3 is a perspective view of a traveling valve assembly in accordance with one or more aspects of the present invention.
FIG. 3A is a partially cut-away perspective view of the traveling valve assembly shown in FIG. 3.
Figure 3B:
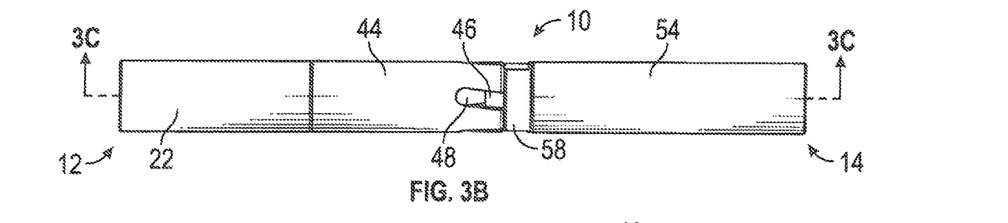
FIG. 3B is a side view of the traveling valve assembly shown in FIG. 3.
Figure 3C:
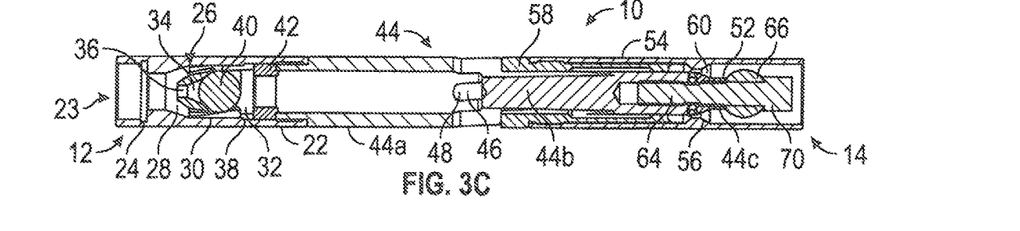
FIG. 3C is a side, cross-sectional view taken along line 3C-3C of FIG. 3B.
Figures 4, 4A:
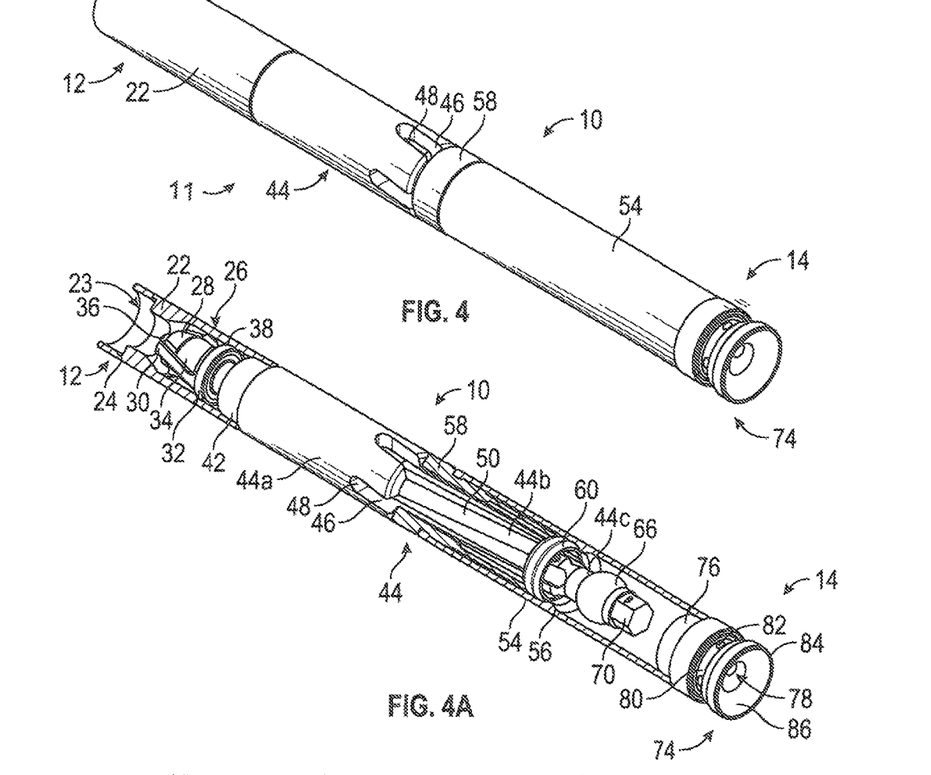
FIG. 4 is a perspective view of another embodiment of the traveling valve assembly in accordance with one or more aspects of the present invention.
FIG. 4A is a partially cut-away perspective view of the traveling valve assembly shown in FIG. 4.
Figure 4B:
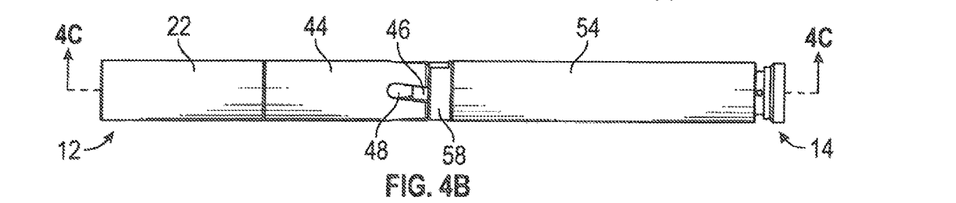
FIG. 4B is a side view of the traveling valve assembly shown in FIG. 4.
Figure 4C:
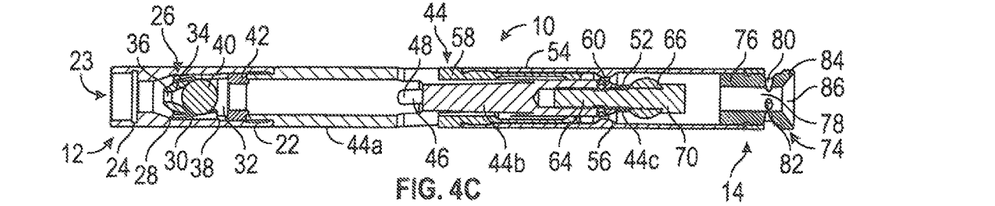
FIG. 4C is a side, cross-sectional view taken along line 4C-4C of FIG. 4B.

Referring to FIGS. 1-3C, an embodiment of the traveling valve assembly 10 of the present invention is shown. In FIG. 1, a northern end 12 of the traveling valve assembly 10 may be coupled to a southern end of a pump plunger 16 of an oil pumping system. Although the term "oil" is used herein, it should be understood that the traveling valve assembly 10 of the present invention may be used to pump fluids other than oil, including for example debris-containing water. The northern end of the pump plunger 16 may then be coupled directly to a southern end of a top plunger adapter 18. Or, optionally as shown in FIG. 1, an additional traveling valve 20 may be coupled between the pump plunger 16 and the top plunger adapter 18. Referring to FIGS. 2-3C, the traveling valve assembly 10 may have a northern end 12 and a southern end 14. Beginning at the northern end 12 and heading southwardly, the traveling valve assembly 10 may comprise: a cage 22; a helical insert 26; a first ball valve having a free-floating ball 40 and seat 42; a helical ported stem 44; a friction chamber 54; a seat plug 58; and a second ball valve having a seat 60, an anchor assembly 62, and an anchored ball 66. At its southern end 14, the traveling valve assembly 10 may also have a sealing ring 72 and an acceleration taper 74 with helical ports 82.

The cage 22 may be tubular in shape, having an elongated channel 23 formed therethrough that is adapted to receive the helical insert 26 therein. An interior portion of the cage 22, proximate the northern end 12 of the traveling valve assembly 10, may have a threaded region so that the northern end 12 of the traveling valve assembly 10 may be coupled to the southern end of the pump plunger 16. Similarly, an interior portion of the cage 22, proximate a southern end of the cage 22, may also have a threaded region so that the southern end of the cage 22 may be coupled to a northern end of the helical ported stem 44. The threaded regions of the cage 22 may be either male or female threading configurations, as desired.

Also in an interior portion of the cage 22, proximate a northern end of the cage 22, is a shoulder 24. The shoulder 24 may be positioned immediately below the threaded region at the northern end of the cage 22. When the northern end of the cage 22 (i.e. the northern end 12 of the traveling valve assembly 10) is coupled to the southern end of the pump plunger 16, then the shoulder 24 may abut the southern portion of the pump plunger 16. This may help to render a tight fit between the traveling valve assembly 10 and the pump plunger 16.

The helical insert 26 may comprise a cradle 28, a plurality of ribs 30 that define a plurality of channels 34 therebetween, and a base 32. The helical insert 26 is adapted to be pressed into the cage 22 so that an outer portion of the helical insert 26 abuts against an inner portion of the cage 22. The cradle 28 may be substantially cup-shaped. The cradle 28 is therefore adapted to receive the free-floating ball 40. The ball 40 may be of a type that is typically employed in conventional oil pumping systems. During the downstroke, the cradle 28 retains the ball 40. This allows the ball 40 to be held in position, thereby allowing fluid to pass freely through channels 34 and around the ball 40 with ease. The cradle 28 also includes a port 36 formed through a northern end of the cradle 28. During the upstroke, the ball 40 will be released from the cradle 28 so that fluid that is being pumped may pass northward through the port 36.

The ribs 30 extend upwardly from the base 32 to the cradle 28. The ribs 30 may terminate at the northern end of the helical insert 26. The ribs 30 may extend upwardly from the base 32 to the cradle 28 in a clock-wise rotational direction at approximately 30 degrees or other suitable angle. The ribs 30 may protrude from the exterior of the cradle 28. Adjacent ribs 30 may define channels 34 therebetween. The width of the channels 34 may be greater than the width of the ribs 30. The channels 34 provide a passageway for the fluid that is being pumped. The ribs 30, and accordingly the channels 34, may be angled, thereby providing an overall radial configuration of the helical insert 26. Furthermore, the ribs 30 may be equally spaced apart.

The base 32 may be ring-shaped. The base 32 is adapted to abut a seat 42. The seat 42 may be stationary as it may be held firmly in place between the base 32 and the helical ported stem 44. The base 32 may also have an angled hook or lip 38. When the helical insert 26 is pressed into the cage 22, the lip 38 may engage itself against the interior portion of the cage 22.

During the upstroke, the ball 40 will rest on the seat 42 eliminating fluid passage beyond that point; i.e. preventing fluid from falling southwardly back into the traveling valve assembly 10.

During the downstroke, the ball 40 would be retained by the cradle 28, thereby sealing port 36. During pumping operations, the overall design of the cage 22 and helical insert 26 enables a zone of relatively low pressure to be created in a center portion of the cage 22 and permits high pressure fluid to move around the ball 40. At this time, fluid that is being pumped would pass freely in a general northward direction around the ball 40 and through the channels 34. Subsequently, the ball 40 may then be allowed to fall faster onto the seat 42 during the next upstroke, thereby increasing the speed of valve closure, which increases the overall effectiveness of the pump.

The helical ported stem 44 may be generally cylindrical in shape and may have three regions of descending diameter sizes: i.e. a northern or top portion 44a, a smaller diameter middle portion 44b, and a still smaller diameter southern or bottom portion 44c. The top portion 44a has a plurality, and preferably four, channels 46 cut therein. The channels 46 may be angled. At the top of each channel 46 is an opening 48 into the interior of the top portion 44a of the helical ported stem 44. The channels 46 may be angled. The middle portion 44b of the helical ported stem 44 may have a plurality, and preferably four, helical flutes 50 cut therein. The helical flutes 50 may be continuous with the channels 46 so they maintain the same angled orientation. Positioned over the middle portion 44b are the seat plug 58 and seat 60. The seat plug 58 may have a base 58a and an elongated body 58b extending from the base wherein the base 58a has a wider diameter than the elongated body 58b. The seat plug 58 may also have a threaded portion proximate a northern portion of its elongated body 58b. The seat plug 58 may be slidably coupled about the middle portion 44b of the helical ported stem 44. The threaded portion of the seat plug 58 may be adapted to engage a corresponding threaded portion in the interior of the northern end of the friction chamber 54 so that that fiction chamber 54 is coupled about a middle portion and southern portion of the seat plug 58. The seat 60 may have a diameter that does not allow it to enter the elongated body 58b of the seat plug 58. The seat 60 may therefore be positioned between the anchored ball 66 and a southern end of the seat plug 58. When the second ball valve is in the closed position, the seat 60 may firmly abut the anchored ball 66 and the southern end of the seat plug 58. When the second ball valve is in the open position, the seat 60 may slightly move or float within the space created between the southern end of the seat plug 58 and the anchored ball 66 (see FIG. 8).

Figures 5, 5A:
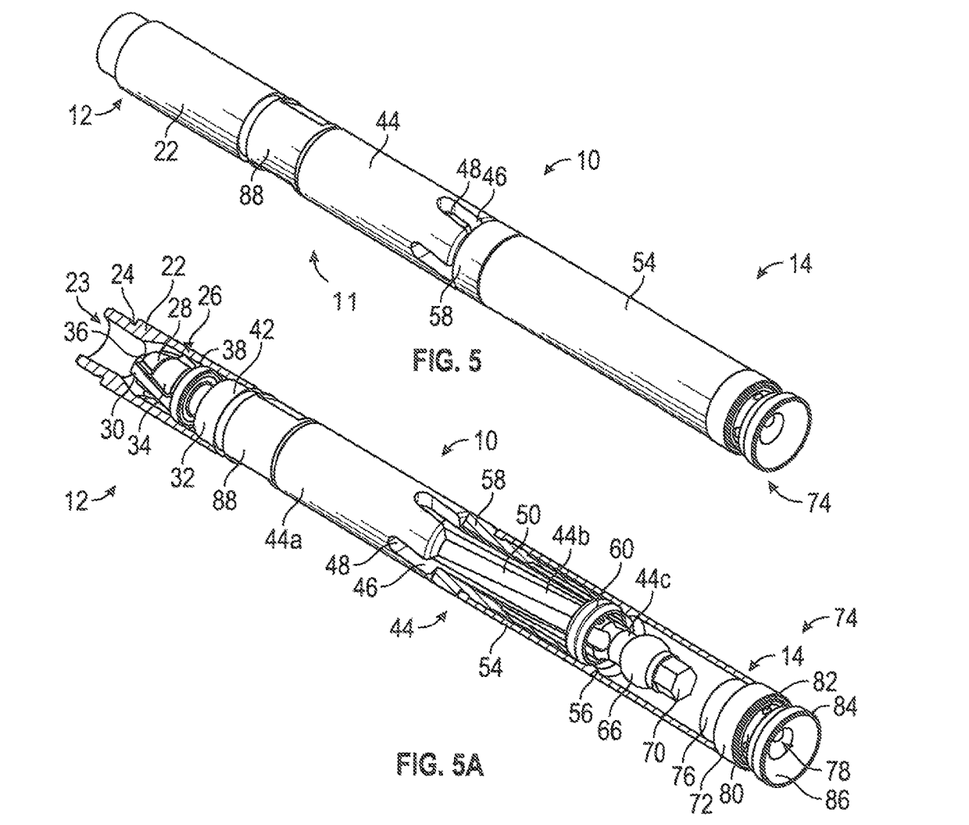
FIG. 5 is a perspective view of another embodiment of the traveling valve assembly in accordance with one or more aspects of the present invention.
FIG. 5A is a partially cut-away perspective view of the traveling valve assembly shown in FIG. 5.
Figure 5B:
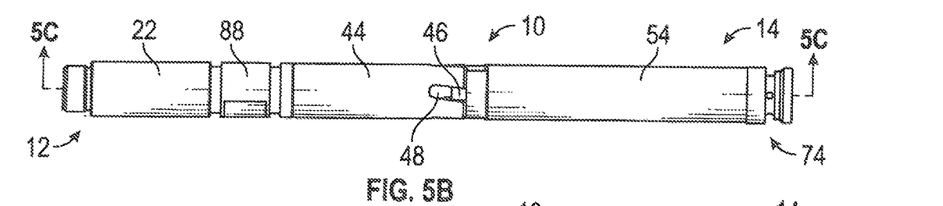
FIG. 5B is a side view of the traveling valve assembly shown in FIG. 5.
Figure 5C:
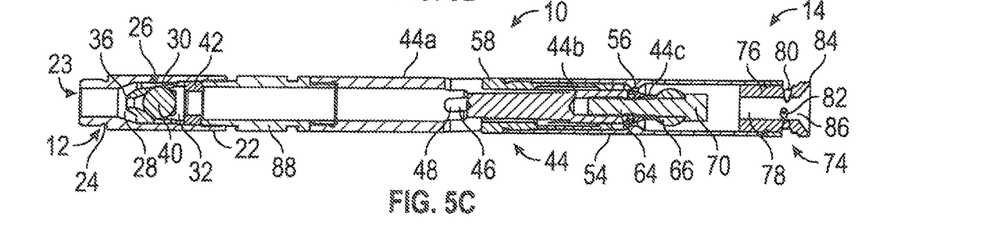
FIG. 5C is a side, cross-sectional view taken along line 5C-5C of FIG. 5B.

The top portion 44a of the helical ported stem 44 may be threaded on an exterior portion of the northern end thereof and be dimensioned to engage a corresponding threaded portion on the interior of the southern end of the cage 22 (see FIGS. 3-4C) or, alternatively, a corresponding threaded portion on the interior of the southern end of a pump plunger 88 (see FIGS. 5-5C). It should also be understood that substantial benefit may be derived if the top portion 44a of the helical ported stem 44 was threaded on an interior portion of the northern end thereof and was dimensioned to engage a corresponding threaded portion on the exterior of the southern end of the cage 22 or, alternatively, the corresponding threaded portion on the exterior of the southern end of a pump plunger 88.

At the bottom portion 44c of the helical ported stem 44 is the anchor assembly 62 (see FIG. 2) and anchored ball 66. The anchored ball 66 has a passage 68 formed therethrough (see FIG. 2). The passage 68 allows the anchored ball 66 to be slidably retained about a shaft 64, wherein the shaft 64 forms a part of the anchor assembly 62. The shaft 64 is inserted and coupled to an interior portion 52 of the bottom portion 44c and/or the middle portion 44b of the helical ported stem 44. Set screws 65 (see FIG. 2) may be inserted through the bottom portion 44c and/or a southern end of the middle portion 44b of the helical ported stem 44 and used to couple the shaft 64 to the interior portion 52 of the bottom portion 44c and/or the southern end of the middle portion 44b of the helical ported stem 44 in order to protect against accidental dislodging. An anchored bolt 70 may then be used to secure the anchored ball 66 to the shaft 64 at a southern portion of the shaft 64. In an alternative embodiment, the anchored ball 66 may be integral to the bottom portion 44c and/or the southern end of the middle portion 44b of the helical ported stein 44.

Figure 6:
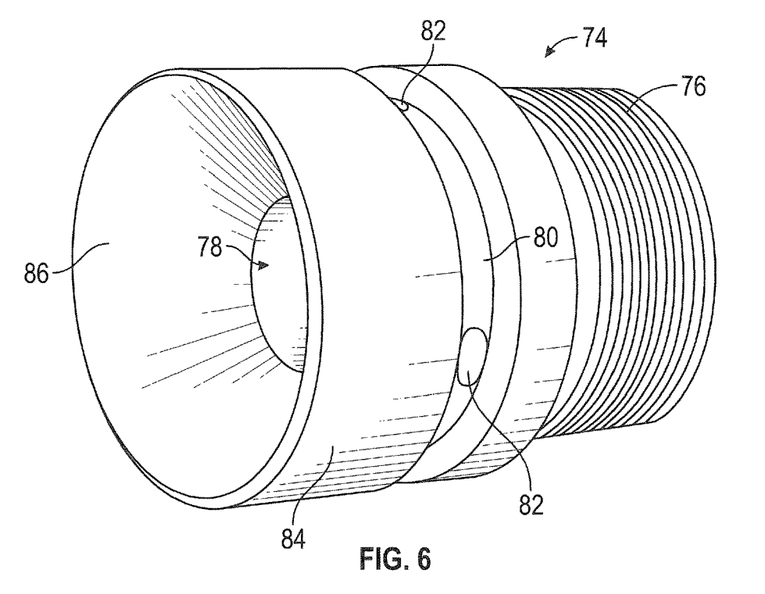
FIG. 6 is a perspective view of the acceleration taper portion of the traveling valve assembly.
Figure 7:
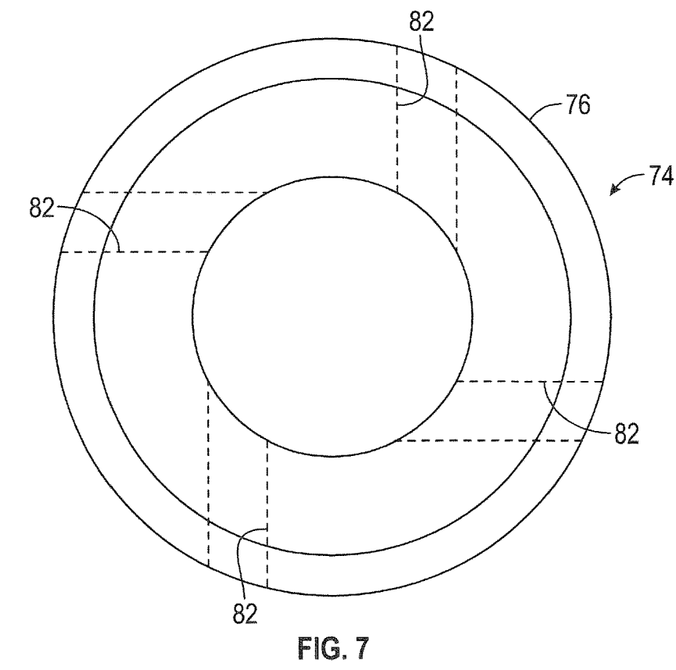
FIG. 7 is a top cross-sectional view of the acceleration taper.

Referring to FIGS. 4-7, the traveling valve assembly 10 may have an acceleration taper 74 coupled to its southern end 14. As shown, the acceleration taper 74 may be coupled to a southern end of the friction chamber 54. The acceleration taper 74 may have a northern end, a southern end, and body 76 with an elongated passage 78 formed therethrough. The acceleration taper 74 also has an annular groove 80 formed on its body 76 proximate the southern end of the acceleration taper 74 and positioned above the tapered opening 86. Within the annular groove 80 may be a plurality (shown as four) of helical ports 82 fonned therein. The helical ports 82 extend from the exterior of the body 76 of the acceleration taper 74 to the elongated passage 78 of the body 76. As shown in FIGS. 6-7, the helical ports 82 may be offset, or non-axial, relative to the center of the elongated passage 78 of the body 76 of the acceleration taper 74 and the acceleration taper 74 also has a base 84 with a tapered opening 86 formed therein.

The northern end of acceleration taper 74 may also have a threaded portion on its exterior which is dimensioned to engage a corresponding threaded portion on an interior of the southern end of the friction chamber 54. Similar to the cage 22, the friction chamber 54 may also have a shoulder 56 on an interior portion of the friction chamber 54, though the shoulder 56 may be proximate a middle portion of the friction chamber 54. The inner diameter of the shoulder 56 in the friction chamber 54 may be only slightly larger than the diameter of the anchored ball 66. During the upstroke, when the traveling valve assembly 10 actuates, the anchored ball 66 may engage the shoulder 56 on the interior portion of the friction chamber 54. This may help to render a tighter fit between the anchored ball 66 and the interior portion of the friction chamber 54.

A sealing ring 72 may be positioned between the threaded portion on the northern end of the acceleration taper 74 and the groove 80 of the acceleration taper 74. The sealing ring 72 may have a zero tolerance so that it drags against the interior of the pump barrel during pumping. The sealing ring 72 prevents pumped fluid that has slipped downwardly past the pump plunger 16 from continuing to slip further down into the pump barrel. The sealing ring 72 helps to capture or accumulate the pumped fluid that has slipped down and hold it in within the friction chamber 54.

During the downstroke, the acceleration taper 74 increases the speed of the fluid that passes through. This increase in speed occurs because the tapered opening 86 of the acceleration taper 74 causes fluid to move from an area of larger diameter to an area of smaller diameter. As fluid and any solids (e.g. sand) within the fluid pass through the tapered opening 86 of the base 84 of the acceleration taper 74 during the downstroke, the helical ports 82 in the groove 80 impart a cyclonic rotation on the fluid and solids. The cyclonic rotation forces any solids within the fluid toward the center of the passage 78 of the acceleration taper 74 while forcing the fluids outwardly toward the interior surface of the body 76 of the acceleration taper 74. During downstroke, the sealing ring 72 prevents fluid and solid from bypassing the acceleration taper 74. Instead, solids and fluid are forced into the acceleration taper 74, into the friction chamber 54 and through the traveling valve assembly 10, then through the pump plunger 16, through the top plunger adapter 18, and then out of the valve rode guide. The fluid and solids are therefore kept off of the external parts of traveling valve assembly 10 and the pump plunger 16 thus causing less wear on the pump plunger 16 and pump barrel.

Referring to FIGS. 5-5C, a second pump plunger 88 may be positioned between the cage 22 and the top portion 44a of the helical ported stem 44. The second pump plunger 88 would also help prevent any solids from slipping downwardly and causing any damage between the pump plunger 16 and the pump barrel. The second pump plunger 88 would crush any large solid matter that might normally slip downwardly. By crushing the large solid matter into smaller pieces, the smaller solids will flow by the pump plunger 16 without damaging it.

STATEMENT OF OPERATION

Figure 8:
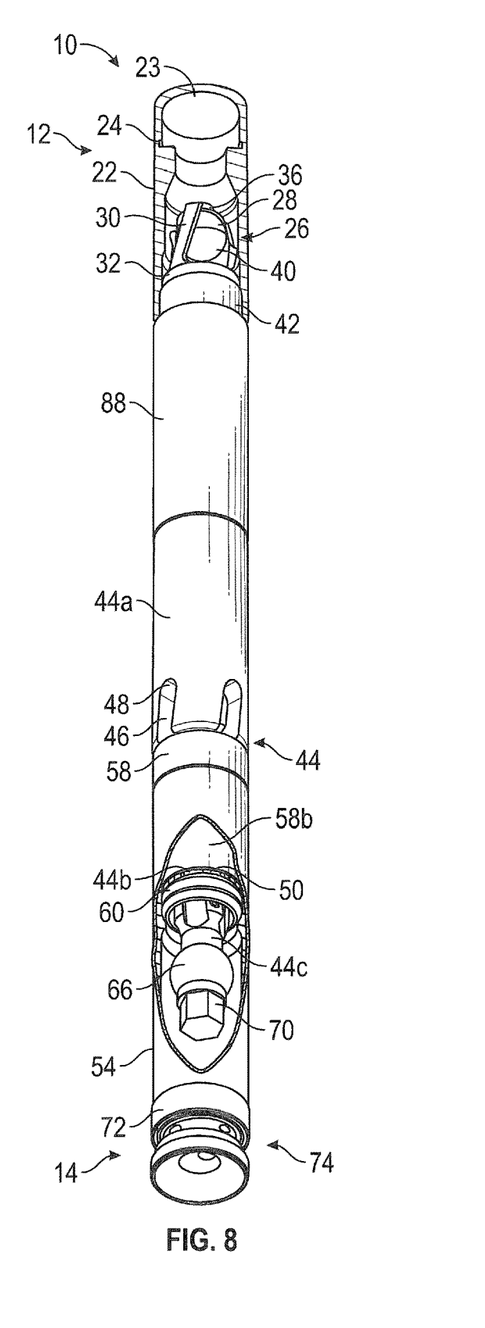
FIG. 8 is a partially cut-away perspective view of an embodiment of the traveling valve assembly during a downstroke.
Figure 9:
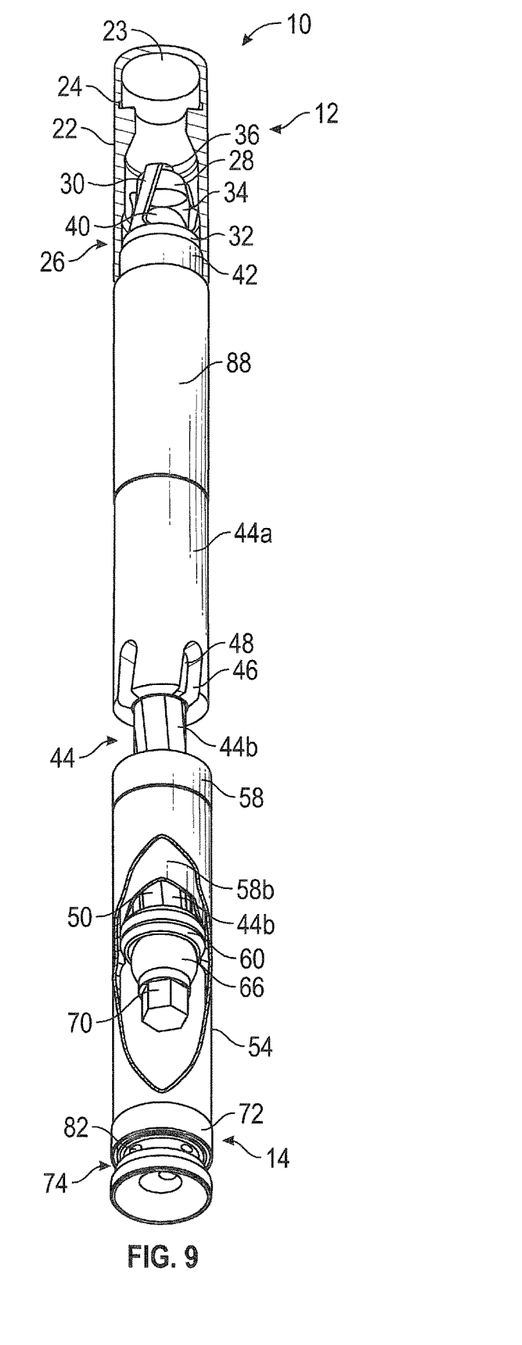
FIG. 9 is a partially cut-away perspective view of an embodiment of the traveling valve assembly during an upstroke.

FIG. 8 shows a traveling valve assembly 10 consistent with one or more embodiments of the present invention. The traveling valve assembly 10 is shown during a downstroke. FIG. 9 shows the traveling valve assembly 10 during an upstroke.

The traveling valve assembly 10 may be coupled, directly or indirectly, to a sucker rod, so that the traveling valve assembly 10 will move up with the upstroke of the pumping unit and down with the downstroke of the pumping unit. In the example shown in FIG. 1, the traveling valve assembly 10 is coupled at its northern end 12 by threadably coupling the northern end of the cage 22 to the southern end of the pump plunger 16.

As with a prior art system, fluid (e.g. oil) will be pumped from a hole through a series of downstrokes and upstrokes of the oil pump, which motion is imparted by the above-ground pumping unit. During the upstroke, formation pressure causes the ball in the standing valve to move upward, allowing the fluid to pass through the standing valve and into the pump barrel. This fluid will be held in place between the standing valve and the traveling valve assembly 10.

Referring to FIG. 8 (downstroke), both of the ball valves in the traveling valve assembly 10 are in an open position; i.e. the floating ball 40 is off of its seat 42 and the anchored ball 66 is off of its seat 60. During a downstroke the ball valve at the southern end 14 may open first and then the ball valve at the northern end 12 may open second. At the southern end 14 of the traveling valve assembly 10, the friction chamber 54 actuates the seat plug 58, pushing the anchored ball 66 off of its seat 60 and holding the anchored ball 66 in an open position. At the northern end 12 of the traveling valve assembly 10, the free-floating ball 40 is retained by the cradle 28, thereby sealing port 36. Fluid that has passed through the standing valve therefore enters the acceleration taper 74 and flows northwardly through the interior of the friction chamber 54, around the anchored ball 66, through the seat 60 and the interior of the seat plug 58, through the helical flutes 50, through the channels 46 and openings 48, through the interior of the top portion 44a of the helical ported stem 44, through the seat 42, through the base 32, around the ball 40, through the channels 34, past the cradle 28 and into the cage 22 before passing northward through the oil pump into the pump tubing and then outward to the flow line. Also, during the downstroke, the ball in the standing valve seats, thereby preventing the pumped fluid from moving back down into the hole.

The helical ports 82 in the groove 80 of the acceleration taper 74 impart a cyclonic rotation on the fluid as it enters the friction chamber 54 and passes through the traveling valve assembly 10. The cyclonic rotation of the fluid creates a centrifuge. This cyclonic spiraling of the fluid has several beneficial effects. First, the spiraling of the fluid creates centrifugal forces that contributes to the elimination of entrained gasses from the pumped fluid. Entrained gasses are drawn or pulled to the center of the centrifuge, making it easier for these gasses to bubble to the surface, thereby reducing the incidence of gasses building up in sufficient quantity within the oil pump to create gas lock.

Spiraling of the fluid also causes solid impurities, such as sand, to be drawn or pulled toward the middle of the fluid centrifuge, leaving the outside portions of the fluid cleaner. Spiraling of the fluid reduces the likelihood that impurities will become trapped between the side of the traveling valve assembly 10 and the interior wall of the pump barrel tending to cause dislodging of such impurities and their passage to the surface with the pumped fluid.

Referring to FIG. 9 (upstroke), both of the ball valves in the traveling valve assembly 10 are in a closed position; i.e. the floating ball 40 is on its seat 42 and the anchored ball 66 is on its seat 60. During an upstroke the ball valve at the northern end 12 may close first and then the ball valve at the southern end 14 may close second. At the northern end 12 of the traveling valve assembly 10, the ball 40 is located in the seated position on the seat 42. This helps to prevent fluid from falling southwardly back into the traveling valve assembly 10. At the southern end 14 of the traveling valve assembly 10, the anchored ball 66 is in the seated position on seat 60. It is held there by the friction chamber 54, which actuates the seat plug 58 and pulls the anchored ball 66 into a closed position. Because the anchored ball 66 is in the closed position at the southern end 14 of the traveling valve assembly 10, fluid that is present within the traveling valve assembly 10 is not permitted to slip downwardly back into the pump barrel during the upstroke. Therefore, fluid that has slipped downwardly past the pump plunger 16 is captured or accumulated within the friction chamber 54 so that it may pass upwardly through the traveling valve assembly 10 during the next pump cycle.

The foregoing description is illustrative of particular embodiments of the application, but is not meant to be limitation upon the practice thereof While embodiments of the disclosure have been described in terms of various specific embodiments, those skilled in the art will recognize that the embodiments of the disclosure may be practiced with modifications within the spirit and scope of the claims.

What is claimed is:

1. A traveling valve assembly for use in a pumping apparatus comprising:
   an elongated body adapted to be coupled to a southern end of a pump plunger, the elongated body having a northern end and a southern end, wherein the elongated body comprises:
   a cage;
   a helical insert positioned within the cage, wherein the helical insert comprises:
      a ring shaped base;
      a plurality of ribs extending upwardly from the base, the ribs defining a plurality of channels therebetween;
      a cradle coupled to the ribs; and
      a port formed through a northern end of the cradle;
   a helical ported stem coupled to a southern end of the cage;
   a seat plug slidably coupled about a portion of the helical ported stem; and
   a friction chamber coupled to the seat plug;
   a first ball valve positioned at the northern end of the elongated body; and
   a second ball valve positioned at the southern end of the elongated body;
   wherein the helical ported stem comprises:
      a top portion comprising:
         a plurality of angled channels formed therein; and
         a plurality of openings into an interior of the top portion of the helical ported stem, wherein one opening is positioned at a top portion of each channel;
      a middle portion having a smaller diameter than the top portion comprising:
         a plurality of helical flutes cut therein, wherein the helical flutes are continuous with the channels of the top portion of the helical ported stem; and
      a bottom portion having a smaller diameter than the middle portion;
      wherein the seat plug is slidably coupled about the middle portion of the helical ported stem;
   wherein the second ball valve comprises:
      an anchored ball having a passage formed therethrough;

an anchor assembly comprising:
  a shaft adapted to be inserted through the passage of the anchored ball and inserted into the bottom portion of the traveling valve assembly and coupled thereto; and
  a bolt coupled to a southern portion of the shaft to secure the anchored ball to the shaft;
a seat positioned above the anchored ball and below a southern end of the seat plug.

2. The traveling valve assembly of claim 1 wherein the first ball valve comprises;
  a free-floating ball that is adapted to move between the ring-shaped base and the cradle of the helical insert; and
  a seat positioned below the ring-shaped base of the helical insert.

3. The traveling valve assembly of claim 1 further comprising an acceleration taper coupled to a southern end of the friction chamber, wherein the acceleration taper comprises;
  a body with a passage formed therethrough;
  an annular groove formed on the body;
  a plurality of helical ports formed within the annular groove and in fluid communication the passage formed through the body of the acceleration taper;
  a base; and
  a tapered opening formed within the base.

4. The traveling valve assembly of claim 3 further comprising a sealing ring positioned above the annular groove, wherein the sealing ring has a zero tolerance and is adapted to hold pumped fluid within the friction chamber.

5. A traveling valve assembly for use in a pumping apparatus comprising:
  an elongated body adapted to be coupled to a southern end of a pump plunger, the elongated body having a northern end and a southern end, wherein the elongated body comprises:
    a cage;
    a helical insert positioned within the cage and above the seat of the first ball valve;
    a helical ported stem coupled to a southern end of the cage;
    a seat plug slidably coupled about a southern portion of the helical ported stem; and
    a friction chamber coupled about a southern portion of the seat plug;
  a first ball valve positioned at the northern end of the elongated body, the first ball valve comprising:
    a free-floating ball; and
    a seat;
  a second ball valve positioned at the southern end of elongated body, the second ball valve comprising:
    an, anchor assembly;
    an, anchored ball; and
    a seat;
  wherein the helical ported stem comprises:
    a top portion comprising:
      four angled channels formed therein; and
      four openings into an interior of the top portion of the helical ported stem, wherein one opening is positioned at a top portion of each channel;
    a middle portion having a smaller diameter than the top portion comprising;
      four helical flutes cut therein, wherein the helical flutes are continuous with the channels of the top portion of the helical ported stem; and
    a bottom portion having a smaller diameter than the middle portion;
    wherein the seat plug is slidably coupled about the middle portion of the helical ported stem;
  wherein the anchor assembly of the second ball valve further comprises;
    a shaft adapted to be inserted through a passage formed through the anchored ball and inserted into the bottom portion of the traveling valve assembly and coupled thereto; and
    a bolt coupled to a southern portion of the shaft to secure the anchored ball to the shaft.

6. The traveling valve assembly of claim 5 wherein the helical insert comprises:
  ring-shaped base;
  a plurality of angled ribs extending upwardly in a clockwise rotational direction from the base, the ribs defining a plurality of angled channels therebetween;
  a cradle coupled to the ribs at an opposite end of the ring-shaped base; and
  a port formed through a northern end of the cradle.

7. The traveling valve assembly of claim 5 further comprising:
  an acceleration taper coupled to a southern end of the friction chamber, wherein the acceleration taper comprises:
    a body with a passage formed therethrough;
    an annular groove formed on the body;
    a plurality of helical ports formed within the annular groove and in fluid communication with the passage formed through the body of the acceleration taper;
    a base; and
    a tapered opening formed within the base; and
  a sealing ring positioned above the annular groove, wherein the sealing ring has a zero tolerance and is adapted to hold pumped fluid within the friction chamber.

8. A traveling valve assembly for use in a pumping apparatus comprising:
  an elongated body adapted to be coupled to a southern end of a pump plunger, the elongated body having a northern end and a southern end wherein the elongated body comprises:
    a cage;
    a helical insert positioned within the cage;
    a helical ported stem coupled to a southern end of the cage;
    a seat plug slidably coupled about a portion of the helical ported stem; and
    a friction chamber coupled to the seat plug;
  a first ball valve positioned at the northern end of the elongated body;
  a second ball valve positioned at the southern end of the elongated body; and
  an acceleration taper coupled to a southern end of the friction chamber, wherein the acceleration taper comprises;
    a body with a passage formed therethrough;
    an annular groove formed on the body;
    a plurality of helical ports formed within the annular groove and in fluid communication the passage formed through the body of the acceleration taper;
    a base; and
    a tapered opening formed within the base.

* * * * *